J. MITCHELL.
MODE OF MANUFACTURING PISTON-SPRINGS.
No. 171,157.
Patented Dec. 14, 1875.
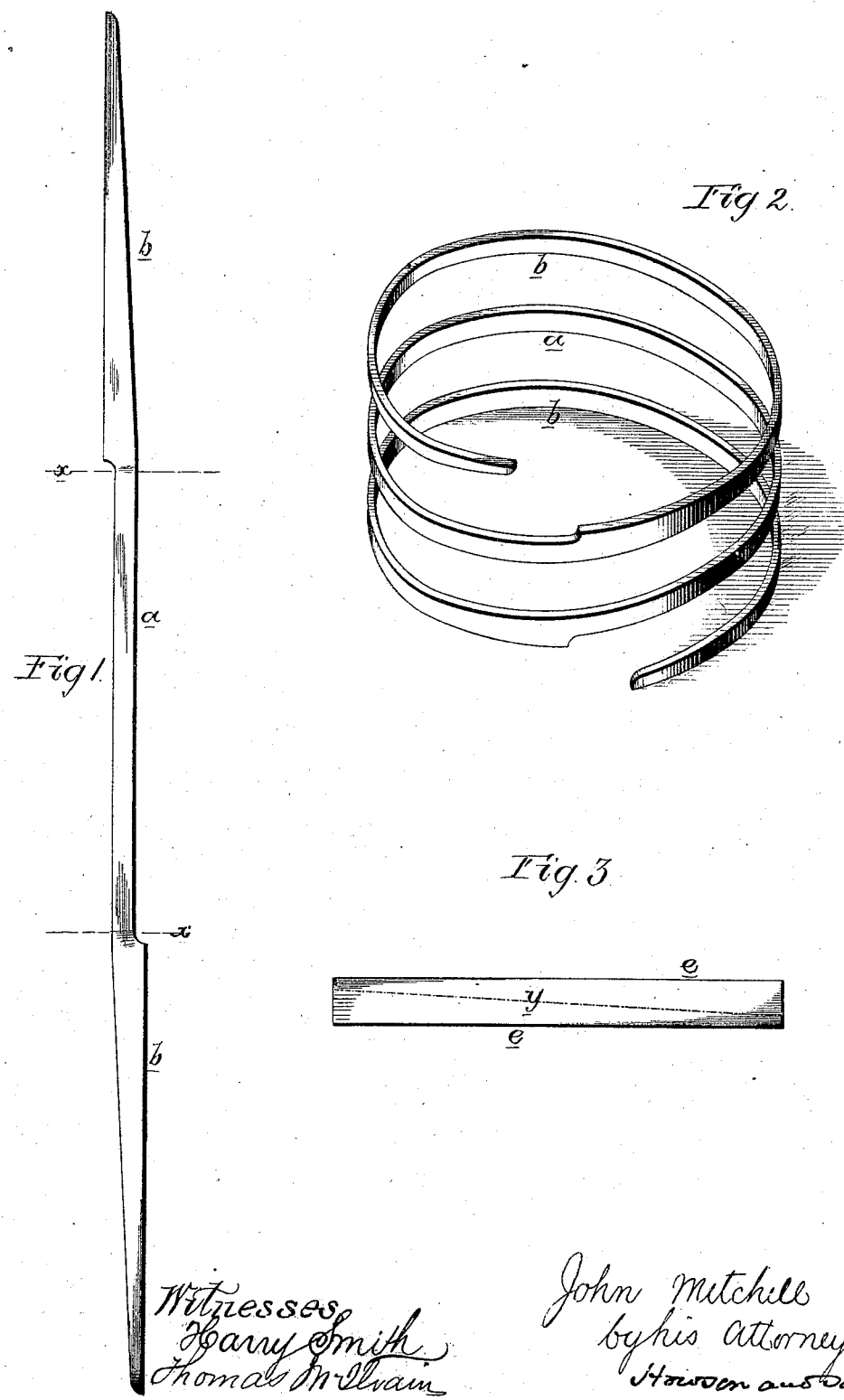

UNITED STATES PATENT OFFICE.

JOHN MITCHELL, OF PHILADELPHIA, PENNSYLVANIA.

IMPROVEMENT IN MODES OF MANUFACTURING PISTON-SPRINGS.

Specification forming part of Letters Patent No. 171,157, dated December 14, 1875; application filed November 22, 1875.

*To all whom it may concern:*

Be it known that I, JOHN MITCHELL, of Philadelphia, Pennsylvania, have invented an Improved Mode of Manufacturing Piston-Springs, of which the following is a specification:

The object of my invention is to make a more durable and efficient spring for forcing out the packing-rings of pistons than those of ordinary construction; and this object I attain in the manner which I will now proceed to describe, reference being had to the accompanying drawing, in which—

Fig. 1 is a view of a steel bar, formed for conversion into the piston-spring, and Fig. 2 the bar coiled to form the spring.

In manufacturing springs of this class it has been the practice heretofore to turn a cast-iron cylinder inside and out, and then to sever it spirally, so as to form the desired spring, which is of limited resiliency and wanting in durability, owing to the removal of the skin of the metal by turning.

I discard cast-iron as a metal for the manufacture of these springs, which I make of steel in the following manner: I take a flat steel bar, *a*, of a length sufficient to form one coil of the completed spring, and to each end of this bar, at about the line *x x*, I weld the end of a bar, *b*, of steel of the same length as the bar *a*, and of the tapering form shown in Fig. 1. The bar thus formed is without any preparation of its surface other than simple cleaning coiled to the desired form of a piston-spring, which is stronger in proportion to its weight, and much more durable and elastic than an ordinary cast-iron spring. I prefer to form the tapered bars *b b* by first taking a plate, *e*, Fig. 3, and then severing it on the dotted line *y* by a planing-machine or other suitable means, so as to form two bars having the required taper. Other means of forming these bars may, however, be employed.

I claim as my invention—

The mode herein described of manufacturing piston-springs—that is to say, first, forging a bar of steel to the shape, Fig. 1, and then coiling the bar, as set forth.

In testimony whereof I have signed my name to this specification in the presence of two subscribing witnesses.

JOHN MITCHELL.

Witnesses:
   HARRY HOWSON, Jr.,
   HARRY SMITH.